United States Patent [19]

Messina

[11] Patent Number: 5,462,389
[45] Date of Patent: Oct. 31, 1995

[54] UNDERSEA CABLE BURIAL PLOWSHARE AND SLED APPARATUS

[75] Inventor: Frank D. Messina, New Providence, N.J.

[73] Assignee: AT&T IPM Corp., Coral Gables, Fla.

[21] Appl. No.: 189,855

[22] Filed: Feb. 1, 1994

Related U.S. Application Data

[63] Continuation of Ser. No. 35, Jan. 4, 1993, abandoned.

[51] Int. Cl.⁶ ............................................. E02F 5/10
[52] U.S. Cl. ...................... 405/183; 172/700; 405/164
[58] Field of Search ............................ 405/164, 183; 37/366, 370; 172/699, 700, 722

[56] References Cited

U.S. PATENT DOCUMENTS

| | | | |
|---|---|---|---|
| 2,337,777 | 12/1943 | Seaholm | 172/722 |
| 3,001,591 | 9/1961 | Johnson | 172/700 |
| 3,268,012 | 8/1966 | Ratkowski | 172/700 |
| 3,659,426 | 5/1972 | Caldwell | 405/183 |
| 4,102,407 | 7/1978 | Danszky et al. | 172/700 X |

*Primary Examiner*—David H. Corbin
*Attorney, Agent, or Firm*—Charles E. Graves; Martin I. Finston

[57] ABSTRACT

This disclosure describes a physical design for an ocean floor trenching tool. The tool consists of a replaceable forward-extending plowguard and detachable hardened plow tips. Surfaces forming the tool's mouth around the plowguard cause the tool to penetrate the ocean bed under normal operation. The surfaces are also effective to "spoil" or break up the compacted bed for easier tool advancement. If an unplowable obstacle is encountered, the plowguard prow rides up and over it, clearing the plow tips away from potential damage. Once past the obstacle, the tool again planes down to operating depth. The tool is useful as a plowability assessment device. With addition of a cable-burying rear chute, the tool can also bury repeatered or repeaterless cable.

4 Claims, 4 Drawing Sheets

UNDERSEA CABLE BURIAL PLOWSHARE AND SLED APPARATUS

This application is a continuation of application Ser. No. 08/000035, filed on Jan. 4, 1993, now abandoned.

FIELD OF THE INVENTION

This invention relates to undersea cable burial apparatus and, more specifically, to a cable burying plowshare and vehicle which is particularly, although not exclusively, useful in undersea plowability assessment applications.

BACKGROUND OF THE INVENTION

Submarine telecommunications cables installed in shallow water or near-shore locations frequently must be buried beneath the ocean floor in order to avoid their exposure to towed fishing nets, anchors or other mechanisms which might damage the cable in a physical encounter. To install buried cable, towed cable-burying sleds equipped with bottom-penetrating plowshares are used to position the cable a few feet into the ocean bed at such locations.

The geologic makeup of ocean bottoms varies in density, hardness and compactability, and include non-cohesive sand and gravel, loose boulders, cohesively clay solid limestone and even harder materials such as rock. The cable-burying plowshares, therefore, must be stable, durable, easy to maintain, capable of passing the cable and possibly repeaters, and not be susceptible to snagging. Plowshares of the prior art do not perform according to these requirements in many circumstances, occasioning damaged apparatus and costly losses of burying time.

Experience with cable burying also has driven submarine cable installing companies to making plowability assessment surveys prior to committing the burying apparatus to a particular route. However, apparatus with a full range of useful features which can provide a cost-effective survey and successfully make the required soil assessments is not currently available. These include rapid deployability, fast travel along the candidate burial route, and the ability to accurately assess the route's soil conditions. In order that the survey be realistic, the apparatus must also replicate many of the functions of the actual cable burying sled. That is, the overall apparatus must be towable robust and without tipping; and the plowshare must be durable and able to respond to various soil conditions encountered in a manner in which the actual cable burial plowshare would respond. The ideal plowshare should have equal utility in both the survey and the actual burial application, without substantial modification.

SUMMARY OF THE INVENTION

An ocean cable-burying vehicle suitable for plowability assessment surveys incorporates a plowshare with improved anti-snagging and other operating characteristics. In accordance with the invention, the plowshare basically comprises a thin forward guard sandwiched between a relatively wide digging plowshare. The guard provides snag protection while the plowshare on both sides of the guard provides digging efficiency. A soil penetrometer is also mounted on the vehicle to provide "real time" soil assessment.

Under normal circumstances and in permeable bottoms, the plowshare is self-burying to a predetermined depth. Tool forces in the horizontal and vertical directions are continuously measured and correlated with both tow tension and soil strength measurements when taken. When hard soil or an obstacle is encountered, the plowshare rides up, over, and then back down continuing its operation rapidly and smoothly. The rise of the plowshare is detected and serves to instantly initiate penetrometer measurements to determine more precisely likely plowability or jetability characteristics of the obstacle. Recording apparatus plots vehicle location with respect to a surface towing platform or ship; and plots the path of the plowshare in a vertical plane.

Advantageously, the vehicle also may be equipped with a forward-looking obstacle avoidance sonar, pan and tilt TV-cameras, and dynamic performance measures including vehicle forward speed, vehicle distance traveled and vehicle pitch and roll attitude, all of which are provided to a surface ship operator console. A vehicle-mounted hydrophone permits the system operator to sense any unusual sounds which might indicate abnormal operating functions. The hydrophone also relays typical work sounds such as the impact of surface rocks or a continuous hard layer and the characteristic differences between clay and gravel seabeds.

The invention will be more fully understood from a reading of the detailed description to follow.

DETAILED DESCRIPTION OF AN ILLUSTRATIVE EMBODIMENT

Figure 1:
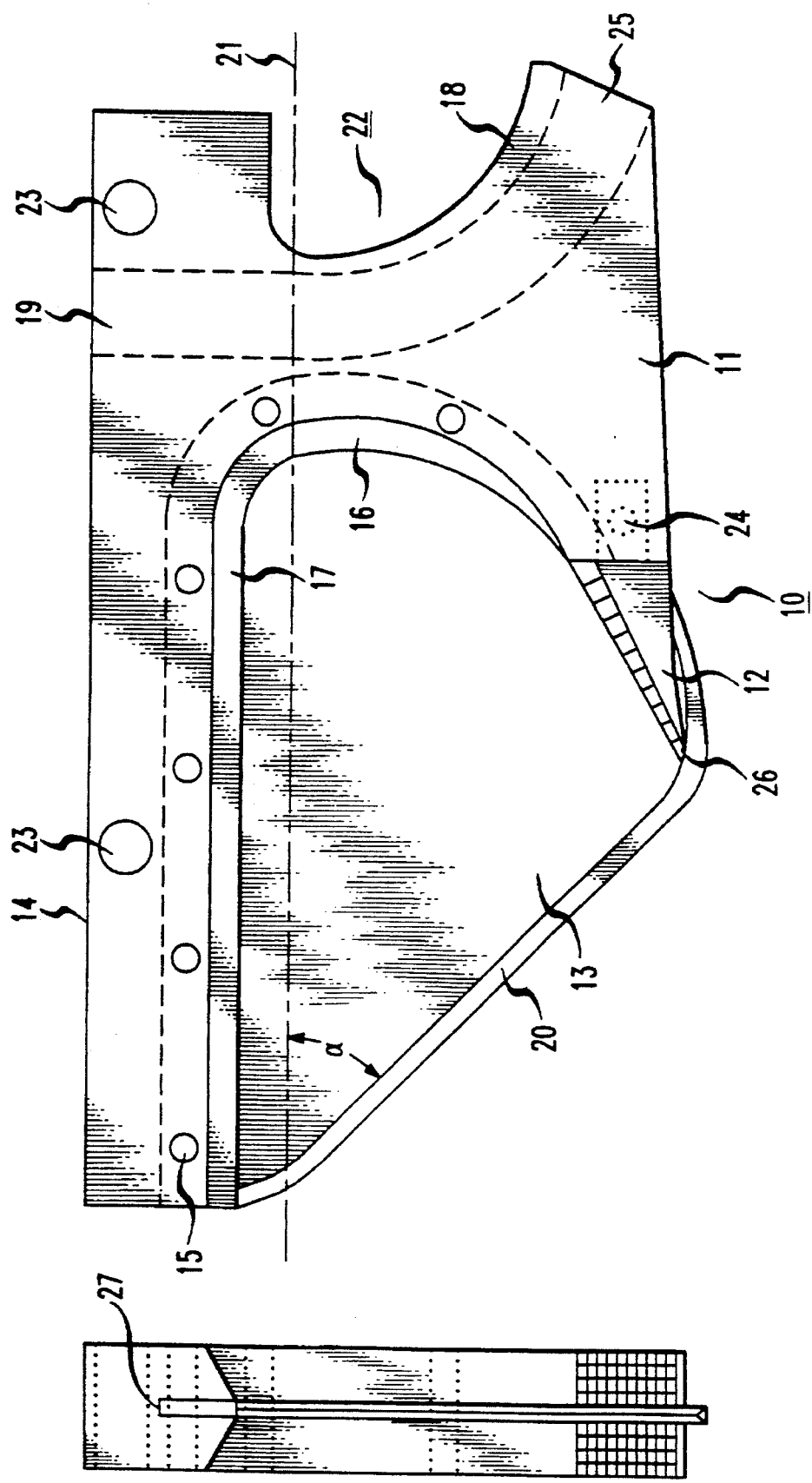
FIG. 1 is a front and side view of the trenching tool.
Figure 2:
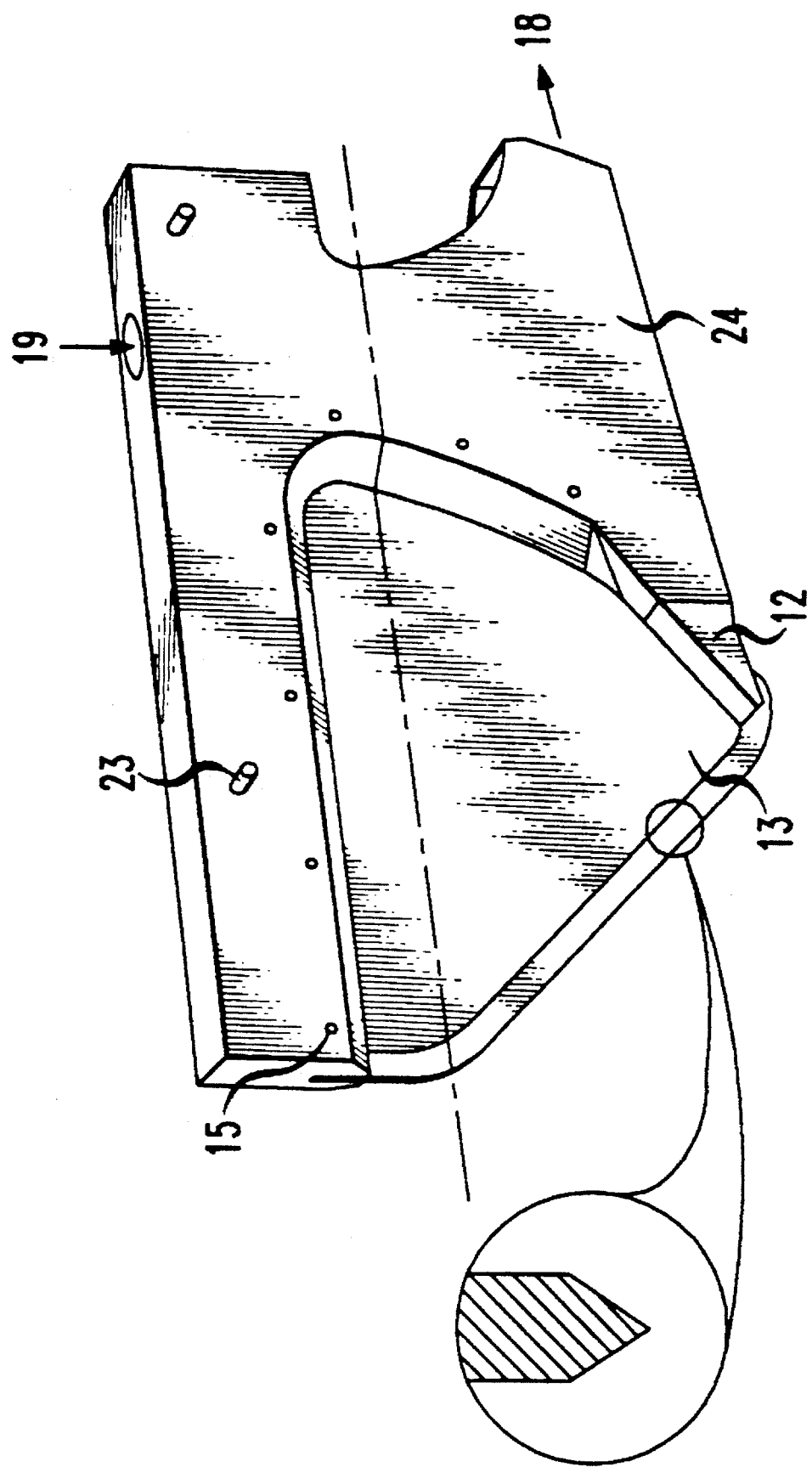
FIG. 2 is a side perspective view of the tool.

FIG. 1 shows the trenching tool of the present invention, denoted 10. The tool achieves both digging efficiency as well as snag protection. It consists of a heavy steel shank 11 formed with soil-penetrating plowtip blades 12 on either side. These are detachably fastened with anchor bolts 24. A blade-like plowguard 13 is mounted in the forward mouth of the tool and between the plowtip blades 12. One mounting method is to provide a slot 27 running along the bottom edge of the frame 14 and continuing around the front edge of shank 11. The plowguard 13 advantageously is a heavy metal plate, its forward edge 20 having the shape of a ship's prow. The forward edge extends well ahead of and below the blades 12. To protect the blades from damage, the forward edge 20 advantageously has a hardened surface. Plowguard 13 is fastened to the frame 14 with several recessed bolts 15.

Spoiling

A soil diverter 16 is formed by bevelling the leading edge of the shank section above the plowtip blades 12 and by bevelling the underside of frame 14. In relatively unobstructed soil, the net vertical forces permit the trenching tool 10 to slice into the bottom terrain to full design depth. In this orientation, the plowguard 13 initially engages and dislodges the soil, an operation called "spoiling," to enable the plowtip blades 12 to penetrate and plow the soil with relatively less force. Spoiling is also promoted by the diverter sections 16 and 17.

Burrowing Capability

The cutting surface of the plowtip blades 12 is hard faced and set at an angle, denoted beta, with respect to the groundline 21. The angle beta advantageously falls within a range of from 20 to 40 degrees. The angularity of the plowtip 12 and the continuous bevel formed by the surfaces 16, 17 draw the tool downwardly into the ocean bed, thereby minimizing the amount of weight and downward force required to maintain a desired burial depth in most soil types.

The trenching tool 10 can be operated in a passive mode in which only the weight of the tool and its self-digging ability determine the penetration depth. In hard bottoms, the tool 10 can be forced down by hydraulic mechanisms included in the sled, which keep the tool at a desired penetration depth. In most soils, however, the above-described plowguard and associated digging surfaces will achieve a suitable burial depth, while limiting overdigging and preventing excessive downward forces.

Anti-snagging

The prow angle, denoted alpha in FIG. 1 as the angle between the plowguard edge 20 and the groundline 2 1, advantageously falls within a range of about 45 to 60 degrees. The leading edge of the plowshares of conventional undersea plows typically are configured to a vertical point. When this pointed surface and tip encounter an obstacle such as a rock outcropping, if the plow tip is unable to rip through this rock, the point tends to dig into or snag on the obstacle, causing excessive tow tension, heavy tool wear and occasionally structural failure in the system. In the present tool, the edge 20 continues underneath the bottom edge 26 of plowtip 12. When an obstruction is encountered during a trenching operation, edge 20 of the plowguard 13 serves to prevent snagging by riding upwardly and over the obstruction, carrying the pointed plowtip 12 with it. The plowtip, therefore, is removed from possible snagging engagement with the obstruction. When the plow progress clears the obstruction, the trenching tool 10 is again driven downward by its weight and the soil forces on the surfaces 16, 17 and trenching continues.

Use as a Cable-Burying Tool

The trenching tool 10 described so far is adapted for plowability assessment and does not bury cable. To adapt the trenching tool to bury cable, the tool body may be lengthened to include a rear trunk section 18. A cable guide path 19 is provided from the top side of the frame 14 through to the rear surface of trunk 18. An exit gate 25 is made wide enough to pass cables equipped with repeaters. To reduce weight of the cable-burying configuration, a cutout 22 may be provided in the trunk section. Typically the gate 25 is placed above the base of the plowtip 12.

Support Frame and Sled

Figure 3:
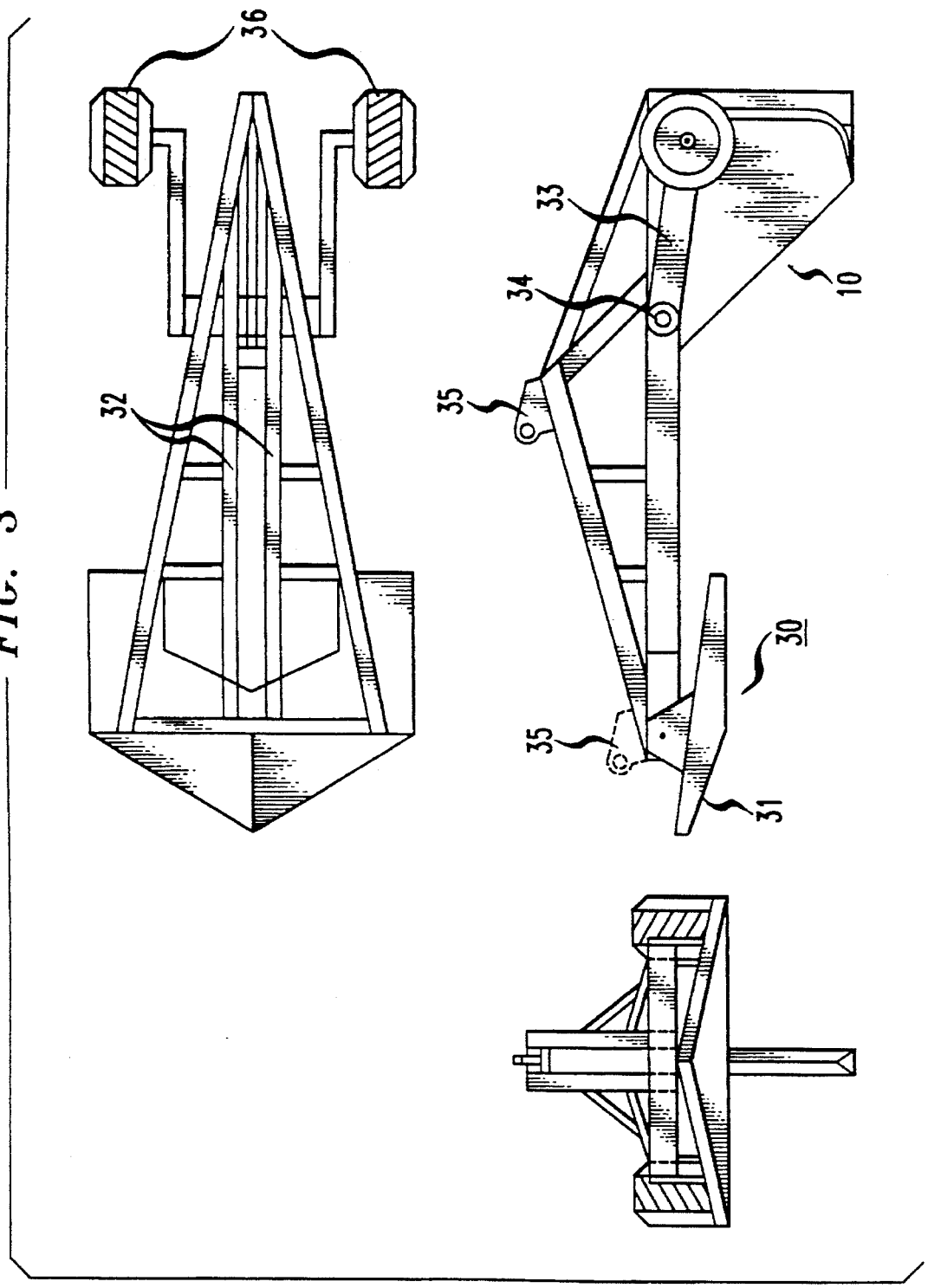
FIG. 3 is a top, front and side view of the tool mounted on a sled.

The tool 10 may be provided with mounting slots 23 in the frame 14 to enable it to be connected to a bottom vehicle. Various vehicles are suitable for mounting the tool 10, one being shown in FIGS. 3 and 4 applies to plowability assessment.

The tool 10 is mounted on a vehicle comprising an A-frame structure 30 pivotally mounted to a forward prow-like sled 31. The A-frame 30 is constructed with a parallel central beam arrangement 32 which provides a protective and stable housing structure for a conventional subsea cone penetrometer (not shown).

The sled 31 may be either a single runner, as shown, or a double runner. This skid arrangement should provide a large bearing area for soft soils and ample free board for obstacle negotiation. Since the sled 31 is the pivot point location for the A-flame 30, it is also free to articulate smoothly over an irregular or undulating sea bottom. The forward section of the vehicle may house a forward-looking obstacle avoidance sonar, a pan and tilt TV-camera, and other required sensors (not shown). The A-flame 30 may also be fitted with a roll-over piping and caging arrangement (also not shown).

Figure 4:
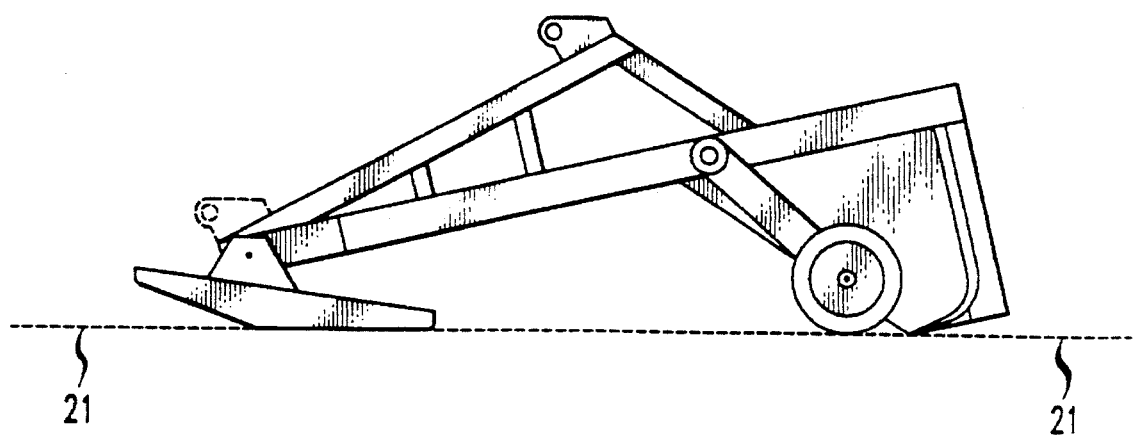
FIG. 4 is a side view of the sled mount showing the stabilizer wheels retracted for clearing an obstacle.

The tool 10 is mounted rigidly to the rear end of the A-flame 30. A pair of suspension arms 33 straddling the tool are pivotally attached on a pivot shaft 34 to the A-frame 30. These suspension arms 33 mount a pair of large stabilizer wheels 36. These may be raised or lowered by hydraulic means (not shown), to allow the tool to clear the plowshare from obstructions or to operate in a float mode during full depth plowing. FIG. 4 shows the suspension arms 33 with the wheels 36 lowered into running contact with the grade 21 to clear an obstruction.

The tool 10 is mounted to the A-frame by mounting pins 23 advantageously instrumented (instruments not shown) so that tool forces in the horizontal and vertical directions can be measured and correlated with both tow tension and soil strength. These data provide important information for determining plowability and jetability in various soil conditions.

The vehicle is towed from a single hitch 35 which is positionable on a slide mount, for example, along the top of A-frame 30. Hitch 35 serves both as a tow and a vehicle lift point depending on its position during the mode of operation. The vehicle is constructed so that its center of gravity is low and almost at its midpoint, preventing a lifting action on the forward section during towing but providing enough downward normal loading on the trenching tool 10 for effective trenching. The tow point is automatically transferred to the lift position during deployment and recovery maintaining a stable, level vehicle attitude.

I claim:

1. A self-burying plowshare having a normal towing direction to be referred to as the forward direction, the plowshare comprising:

a plowshare frame having respective top, right, and left sides, and further having a concave, forward-facing, open mouth portion which has a bottom end;

first and second plowtip blades affixed to respective right and left sides of the plowshare frame, adjacent the bottom end of the open mouth portion, each said blade having an apex;

a plowguard having a top edge, a rear edge, and a soil-contacting leading edge; and means for mounting said plowguard on said frame such that said top and rear edges lie adjacent said frame within said open mouth portion, wherein:

a) each said plowtip blade comprises an upper surface which during normal towing conditions is oriented in relation to impinging soil forces so as to generate a downward force upon said plowshare;

b) the leading edge comprises a forward-facing portion which, during normal towing conditions extends downward and rearward from the soil ground plane at an acute angle with said plane;

c) the leading edge further comprises a foot portion which is continuous with the forward-facing portion, said foot portion and an adjacent part of the forward-facing portion together forming a convex surface; and d) the convex surface partly surrounds a region between the apices of the plowtip blades, such that during normal towing conditions, hard obstructions met by the plowguard will tend to pass below the foot portion without impinging on the plowtip blades.

2. Apparatus in accordance with claim 1, wherein said means for mounting said plowguard on said frame within said open mouth portion comprises:

a slot formed in said plowshare frame around the periphery of said open mouth portion, for receiving the top and rear edges of said plowguard; and means for fastening said plowguard edges to said frame.

3. Apparatus in accordance with claim 2, wherein said plowshare frame further comprises:

a rear extension, said rear extension comprising a chute having an entrance on the top side of said frame;

said chute extending downwardly through said extension to an exit, said exit being placed rearwardly and nominally higher than said plowtip blades.

4. Apparatus in accordance with claim 1, wherein said angle formed between the leading edge of said plowguard and the soil ground plane is in the range of 45° to 60°.

* * * * *